United States Patent
Talayco et al.

(10) Patent No.: US 7,752,346 B2
(45) Date of Patent: Jul. 6, 2010

(54) UNIVERSAL ROUTING IN PCI-EXPRESS FABRICS

(75) Inventors: Daniel Talayco, Sunnyvale, CA (US); Bora Akyol, Sunnyvale, CA (US); Ali Ekici, Sunnyvale, CA (US)

(73) Assignee: APRIUS, Inc., Sunnyvale, CA (US)

( * ) Notice: Subject to any disclaimer, the term of this patent is extended or adjusted under 35 U.S.C. 154(b) by 9 days.

(21) Appl. No.: 11/963,484

(22) Filed: Dec. 21, 2007

(65) Prior Publication Data

US 2009/0164694 A1 Jun. 25, 2009

(51) Int. Cl.
*G06F 3/00* (2006.01)
(52) U.S. Cl. .......................... 710/9; 710/305
(58) Field of Classification Search .............. 710/9, 710/10, 26, 104, 305, 306, 310
See application file for complete search history.

(56) References Cited

U.S. PATENT DOCUMENTS

| 7,380,046 | B2 * | 5/2008 | Boyd et al. | 710/316 |
| 7,430,630 | B2 * | 9/2008 | Boyd et al. | 710/316 |
| 2006/0242354 | A1 * | 10/2006 | Johnsen et al. | 710/316 |
| 2007/0097950 | A1 * | 5/2007 | Boyd et al. | 370/351 |
| 2008/0235430 | A1 * | 9/2008 | Boyd et al. | 710/316 |
| 2008/0235785 | A1 * | 9/2008 | Boyd et al. | 726/13 |

* cited by examiner

*Primary Examiner*—Khanh Dang
(74) *Attorney, Agent, or Firm*—Courtney Staniford & Gregory LLP

(57) ABSTRACT

A universal routing identifier (URID) is provided to extend the function space in PCI-Express fabrics. Methods and systems based on the URID are provided for configuring URID capable devices and upgrading PCI-Express bridges and switches having lookup tables with access control functionality. The lookup table entry contains URIDs of destination ports, backup ports, acceptance ports, and permitted ports for downstream and upstream filtering, routing and arbitrating of transaction packets. URID capable devices can be incrementally added to current PCI-Express bridges and switches. A configuration mechanism is added to the current PCI/PCI-Express enumeration software. The URID capabilities can be disabled to maintain system compatibility. A URID capable PCI-Express system is able to address ten of thousands single-function devices. A URID capability segment field is provided in the current PCI-Express configuration space. Each URID capable device contains the URID capability segment implemented in its own set of configuration space registers.

24 Claims, 5 Drawing Sheets

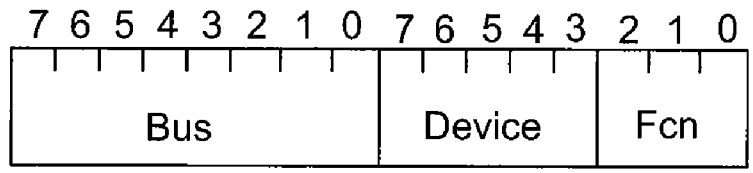
Figure 5a (Prior Art)
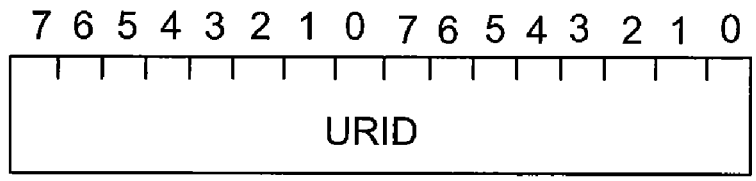
Figure 5b
| 31 | 20 | 15 | 0 | |
|---|---|---|---|---|
| Next Pointer | Ver | Capability ID | | 1 |
| Base URID (R/W) | | Functions Required (RO) | | 2 |
| Control (R/W) | | Capabilities (RO) | | 3 |
| Reserved | | Limit URID (R/W) | | 4 |
| Reserved | | | | 5 |
| Reserved | | | | 6 |
| Reserved | | | | 7 |
| Reserved | | | | 8 |
R/W = Read/Write
RO = Read Only
Figure 6

| Dest | BkUpPort | AcceptancePort | PermittedPort |

Dest = Destination port URID
BkUpPort = Backup port URID
AcceptancePort = Accepted port URID for downstream
PermittedPort = permitted port URID for upstream

Figure 9

UNIVERSAL ROUTING IN PCI-EXPRESS FABRICS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

A standard Peripheral Component Interconnect (PCI) bus is generally known as a local parallel bus that allows expansion cards to be added into a single computer system. Examples of commercially available expansion cards with PCI bus interface are SCSI (data storage) cards, wireless LAN add-in cards, analog and digital TV tuner add-in cards, USB and FireWire controllers, Gigabit Ethernet add-in cards, etc. The PCI bus communicates with a single CPU or multiple CPUs of the computer system through a PCI-bridge controller. Several PCI bridges may exist in a computer system and couple a diversity of input/output (IO) devices to the multiple CPUs of the computer system.

The PCI bus standard uses an 8-bit address for addressing up to 256 possible PCI buses, each bus supports up to 32 devices (5-bit device number), each device contains up to 8 functions (3-bit function number). The 8-bit bus number, the 5-bit device number and the 3-bit function number, in short BDF hereinafter, form a routing identifier (ID) for the PCI bus subsystem. FIG. 1 shows a basic computer system containing two PCI buses. Two devices and a bridge are connected to the first bus (Bus 0), and three devices are connected to the second bus (Bus 1). The routing ID for each device starts with the bus number.

The PCI protocol is based around functions within a device which generates transactions. The requester generates a request transaction and the completer responds with a completion transaction. The completion is routed back to the requester by means of the requester's routing ID. Data are assembled in packets and moved across PCI bridges or switches. Each packet contains the requester ID (a 16-bit source address) and the destination ID (the completer address, which is identified by the 16-bit BDF). FIG. 2 illustrates an example of a request transaction originating from the root complex and a completion transaction from Device B.

PCI-Express (PCIe) is a modification of the standard PCI bus. It uses a point-to-point high-speed serial communication instead of a bus structure of the PCI bus. However, in order to maintain software compatibility, it is architected with the same PCI tree structured I/O interconnect topology. As the PCIe is a point-to-point interconnection, only one PCIe device can sit on a bus. Consequently, the number of supported devices drops to the number of buses. This architecture severely limits the number of devices that can exist in a PCI subsystem.

PCIe encodes transactions using a packet based protocol. Various types of packets such as memory read and write requests, IO read and write requests, message requests and completions are defined. A PCIe packet is shown in FIG. 3.

In the PCIe topology, Bus 0 denotes the device that connects the CPU and memory subsystem to the PCIe fabric. It may support one or more PCIe ports. For example, the root complex in FIG. 1 supports 2 devices and a bridge. Root complex (RC) transmits packets out of its ports and receives packets on its ports. A multi-port root complex may also route packets from one port to another port.

The root complex initializes with a bus number, device number and function number, referred to together as the bus-device-function (BDF) number, which are used to form a completer ID. The root complex BDF initializes to all 0s.

PCIe endpoints implement Type 0 PCI configuration headers and respond to configuration transactions as completers. Each endpoint is initialized with a device ID (requester ID or completer ID) which consists of a bus number, device number and function number. Endpoints are always device 0 on a bus.

Components and terminology used in a PCIe system are further described below. In the context of PCIe, a root complex is a component in a PCIe hierarchy that connects to the CPU and the memory subsystem on the upstream and one or more PCIe links on the downstream. That is, the root complex (RC) denotes the device that connects the CPU and memory subsystems to the PCIe fabric. A PCIe fabric encompasses all devices and links associated with an RC. A bridge connects two PCI buses. A switch consists of at least two or more logical PCI-to-PCI bridges with each bridge associated with a switch port. A port is the physical interface between a PCIe component and the PCIe link. A packet is information moved across an active PCIe link. An upstream port is a port that points in the direction of the RC. A downstream port is a port that points away from the RC. An endpoint is a device located at the downstream of the RC having one to eight functions. An endpoint is an upstream port. An RC port is a downstream port. A requester is a device that originates a transaction in the PCIe fabric. A completer is a device addressed by a requester.

A PCIe link is equivalent to a logical PCI bus, i.e., each link is assigned a bus number by the bus enumerating software. The first link associated with the RC is bus number 1. Bus 0 is an internal virtual bus within the RC. The internal bus within a switch that connects all the virtual bridges together is also numbered. FIG. 4 shows an example structure of a PCIe switch. A bus number is assigned to each port, upstream and downstream, (Bus 1, Bus 3, Bus 4, and Bus 5) as well as an internal bus (Bus 2) that connects the upstream port with the downstream ports. In order to maintain the PCI bridge topology, the PCIe switch allocates a bus number for each of its ports and its internal bus in this manner.

To get around the bus number limitation, two techniques are available: The non-transparent bridge (NTB) and the alternative routing interpretation (ARI).

A non-transparent bridge is a bridge that exposes a Type 0 control-and-status register (CSR) header on both sides and forwards transactions from one side to the other with address translation. Because it exposes a Type 0 CSR header, the bridge appears to be an endpoint to discovery and configuration software, eliminating potential discovery software conflicts. Since devices on one side of the bridge are not seen or exposed on the other side as in a conventional PCI bridge, the so designed bridge is called non-transparent bridge. Non-transparent bridges add expense and complication to the PCIe system and require higher layer applications to properly complete discovery and enumeration of a system.

Alternative routing interpretation (ARI) exploits the fact that, in PCI-Express, device numbers are always 0 for endpoints. It just extends the function number to 8 bits, replacing the device number. The main advantage of this is that existing bridges will continue to work as they use the bus number to route. The disadvantage is that the number of buses supported in the system is still a restriction in many PCI-Express architectures. So ARI does not increase the number of supported devices in a PCI-Express system, only the number of functions a device may support.

As the PCIe is a point-to-point connection, device numbers used previously in a PCI bus to identify the addressed device coupled to a PCI bus are not really useful anymore. The present invention proposes to use the entire 16 bits of the BDF as a system "function space". This 16 bit expanded routing scheme is called the Universal Routing ID (URID). FIG. 5 shows the standard BDF is expanded to a 16-bit URID. The technique of using these numbers in a PCI-Express system is called Universal Routing. The URID will expand the current PCI and PCIe protocols to enable not maximum eight functions per device but 64K (65356) device functions to be connected to the PCIe fabric independent of how they are distributed to devices or upon buses throughout the system. As the result, the PCIe system is able to support tens of thousands of single-function devices. The foregoing description has been presented for purposes of illustration. Obvious modifications or variations are possible in light of the above teachings. For example, the routing identifier can be modified to span a plurality of identifier fields in a standard PCI/PCI-Express format.

In order to expand the existing PCI/PCIe routing capability, the present invention defines a field space in the PCIe packet, called URID capability segment. The URID capability segment can be located anywhere, but at a fixed location, in the PCIe packet, e.g., it can be located within the header, between the sequence number and the header, or preferably within the device configuration space in order to preserve the format of the PCIe packet. This field can be read from or written to by the enumeration software. Based on information contained in the URID capability segment, a URID capable bridge or switch can be configured to support new URID routing to tens of thousands single function devices.

The present invention provides a method for identifying devices capable of URID in a PCIe switched fabric. A PCIe fabric equipped with URID capable devices will be able to address tens of thousands of functions. Conventional PCIe switches will extend their routing table from 8-bit to 16-bit to accommodate the URID concept. A URID capability segment field will be added in the configuration space. The enumeration agent will parse (analyze) this field for identifying URID capable devices and configure the URID capability registers in the corresponding configuration space.

The present invention uses a portion of the current PCIe configuration space to implement additional features. In order to implement additional features, the invention defines a field in the PCIe configuration space called "URID capability segment". All devices capable of URID must have this URID capability segment (FIG. 6).

BRIEF SUMMARY OF THE INVENTION

The present invention provides a mechanism for configuring the base URID for a device. The configuration of the base URID can occur in two ways: a) A URID capable device latches the entire 16-bit URID field when a Type 0 PCI configuration write is addressed to that device. This conforms to the current PCI enumerating process of assigning the bus number and device number; b) The root complex initiates configuration transactions to read from and write to the capability configuration space registers of a URID capable device. A URID capable device is assigned a base URID which remains unchanged ("frozen") when corresponding "capabilities and control" bits in the capability configuration space registers are set (FIG. 6).

The present invention provides a mechanism for a device to communicate to the enumeration agent (the term is used alternatively for enumeration software hereinafter) to obtain the required number of URIDs. Each physical or virtual function of the device in the PCIe system must have an individual URID. The communication of a device URID to the enumeration agent can occur in the following two ways: a) For devices, the enumerator agent reads the number of required URIDs from the URID capability configuration space registers of the device; b) For switches, the number of URIDs required may be implemented as read-only "0" bits in the primary, secondary and subordinate bus registers when the URID capability is enabled. This is similar to the enumeration process allowing memory space address reservations to be expressed by base-address register setup.

The present invention provides a mechanism for the enumeration agent to allocate URIDs to devices in the PCIe system. Upon discovering a device, the enumeration agent issues a Type 0 configuration read to the device to record the number of required URIDs from its URID capability configuration space registers (FIG. 6). The enumeration agent reads the maximum number of functions required in the device and assigns a corresponding number of URIDs. The enumeration agent keeps track of all URIDs already assigned to devices that have been discovered and enumerated. The enumeration agent performs the assignment by issuing a Type 0 PCI configuration write to the target device and records the total number of assigned URIDs. The next device will be allocated the next higher URIDs.

The present invention provides a mechanism for switches to route URID packets based upon a URID routing table. The switching mechanism can be implemented in any of the following ways.

The switch uses the simple adaptation of the bus-based routing scheme by numbering the ports in sequential order. Each port maintains a 16-bit register (Limit URID in FIG. 6) which stores the highest URID available downstream from that port. The content of the 16-bit Limit URID register tells the upstream port the largest URID found downstream from that port. Sequential numbering of URIDs may contain gaps for unused (empty) PCIe slots. Gaps may be left to support hot-plug additions of devices, i.e., the system could continue running and devices could be added. The function of the Limit URID register is explained in detail in late sections together with FIG. 7 and Table 1.

The switch uses a lookup table which is capable of access control, i.e., the switch compares the URID of the transaction packet against the data entry of the lookup table, and forwards or blocks the packet based upon the result of the comparison. The lookup table entry contains for example the URIDs of destination ports, backup ports, downstream acceptance ports, and upstream permitted ports. The switch identifies all devices connected to its ports and assigns the required number of URIDs based on information obtained from the device's capability configuration space registers. The switch updates the lookup table every time a device is removed from or hot-plugged into one of its ports. When a URID capable transaction packet arrives, the switch's routing logic will check the validity of the source ID (delivered in the transaction packet's header) for the source port and verify whether the source port has the permission to route the packet to the targeted destination port. The switch compares the destination URID in the transaction packet against the acceptance ports (for downstream) or permitted ports (for upstream) and send the packet to the destination port when a match is found or the destination URID is within the acceptance or permitted range.

The switch has a data processing unit, e.g., a network processor, that handles exceptions in case of missed lookups due to errors in packets or other protocol mismatches. The data processing unit also verifies the validity of the source ID for the source port. The data processing unit may also check that the source ID has permission to route the packets to the destination port. The data processing unit may contain internal memory or external memory modules such as SRAM, DRAM, and uses software algorithms for comparing and verifying URIDs. The URID comparison could also be implemented in hardware such as content addressable memory (CAM) for achieving high performance.

The URID routing in a current PCIe switch could be implemented incrementally to preserve backwards compatibility with existing hardware. For example, the decision to provide URID routing can be performed on a per-port basis at each URID capable switch in the system. Non-URID capable devices may be treated by the enumeration agent as though they require 256 functions with the base function number properly aligned.

Many advantages are achieved by way of the present invention over the PCIe standard. It is an advantage of at least one embodiment of the present invention to introduce a URID that does not change the format of PCI-Express transaction packets, i.e., URID packets will flow through legacy devices when the system is properly configured.

It is an advantage of at least one embodiment of the present invention that all features related to the URID capabilities can be individually enabled or disabled under software control.

It is yet another advantage of at least one embodiment of the present invention that bridges and switches can be configured to route transaction packets to tens of thousands single function devices.

It is yet another advantage of at least one embodiment of the present invention to provide a lookup table so that a switch or bridge can be configured to have packet filtering and port blocking capability.

BRIEF DESCRIPTION OF THE DRAWINGS

FIG. 5a is a prior art PCI/PCIe BDF address space. It consists of an 8-bit bus number, 5-bit device number and 3-bit function number. FIG. 5b illustrates the proposed URID of an embodiment of the present invention. The standard bus number, device number and function number are replaced with the 16-bit URID. The 16-bit expansion allows the PCI-Express fabric space to work with 64K (65536) device functions independent of how they are distributed to devices or upon buses throughout the system.

FIG. 6 shows an example set of configuration space registers for the URID capability according to the present invention. Eight 32-bit configuration space registers are available for defining the URID capability.

FIG. 9 shows an example of a URID lookup table entry for illustrating the access control functionality of the present invention.

DETAILED DESCRIPTION OF THE INVENTION

Figure 1:
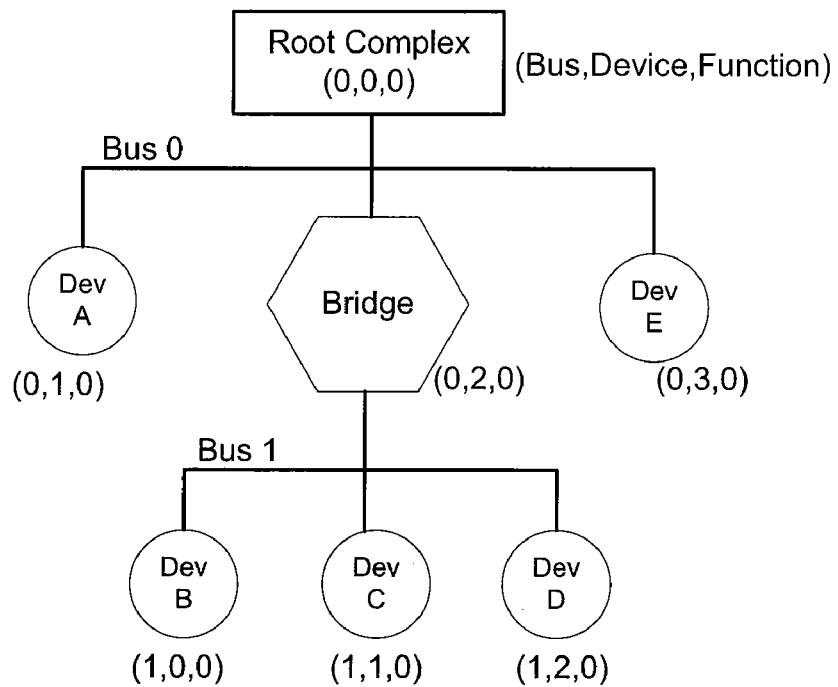
FIG. 1 shows a prior art PCI system with two buses, Bus 0 and Bus 1. The first bus contains two PCI devices and a bridge. The second bus has three devices connected to it. The routing ID for each device starts with the bus number (the first 8 bits) and ends with the function number (the last 3 bits). The root complex has the Bus number 0.
Figure 2:
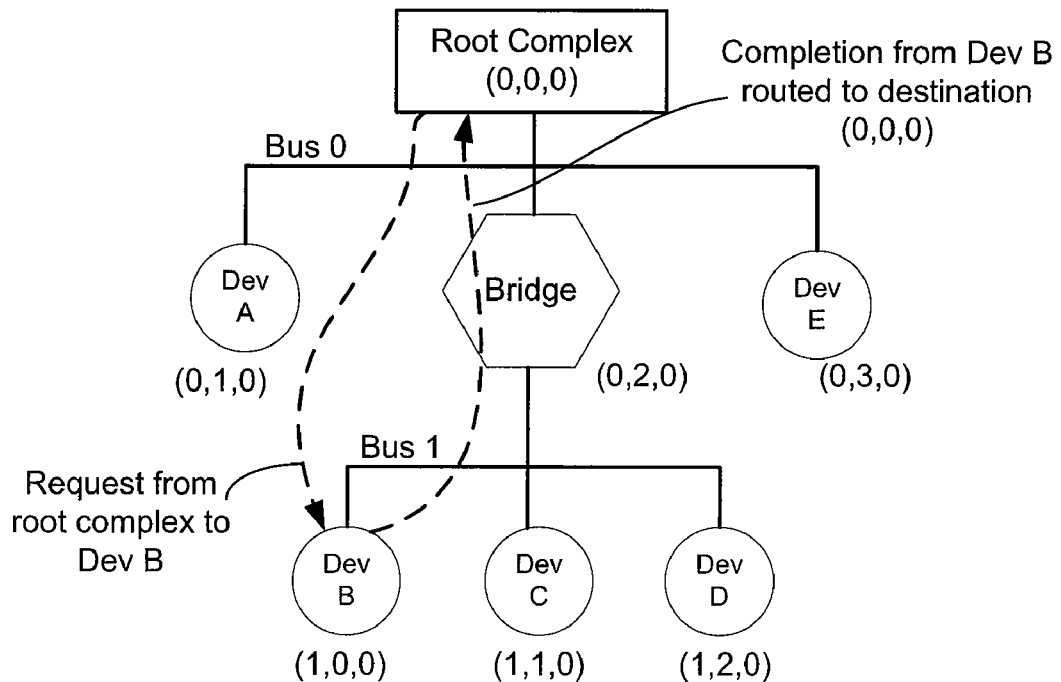
FIG. 2 shows the root complex (0, 0, 0) originates the request transaction as the requester. Device B (1, 0, 0) is the destination of the request.
Figure 3:
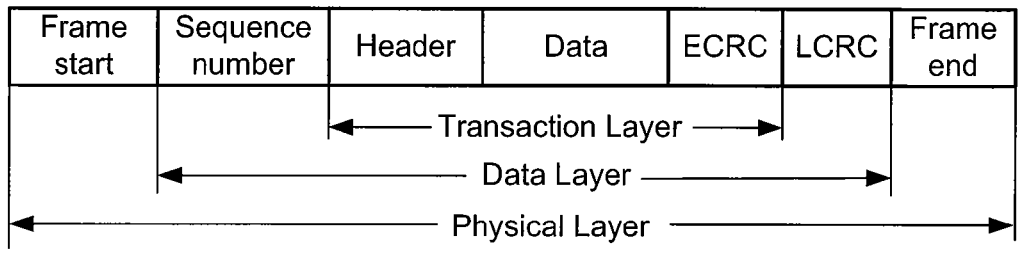
FIG. 3 shows the format of a PCI-Express packet. The transaction layer comprises a header field, a data field and an ECRC error detection field. The data layer adds a sequence number field in front of the transaction layer packet and an LCRC error detection field at the end. A framing field is attached at each end of the packet in the physical layer. The details of each of the blocks are described thoroughly in the PCI-Express Base Specification published by PCI-SIG (www.pcisig.com), which is incorporated by reference herein.
Figure 4:
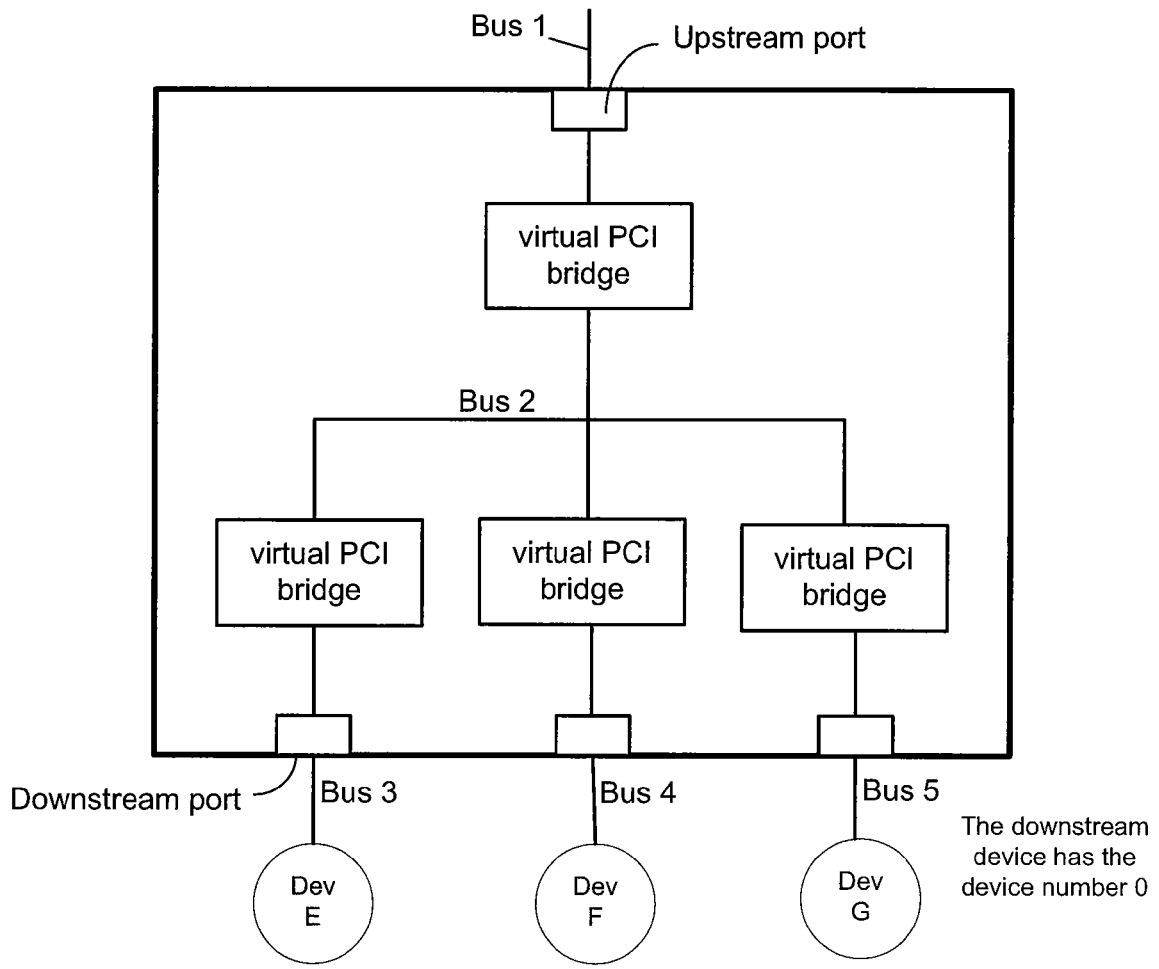
FIG. 4 shows an example of a switch in the PCI-Express system. The switch comprises an upstream port and three downstream ports. Each port is assigned a bus number. A bus number is also assigned to the internal bus which may host more than one downstream bridge interface.

The root complex (RC) initializes with a bus number, device number and function number (BDF) that are used to form a requester ID or completer ID. The RC BDF initializes to all 0s. FIG. 2 shows that the root complex (the requester) originates a request transaction to the destination device B which is the completer. The RC inserts the 16-bit requester (source) ID and the BDF (1,0,0) of the target device in the header of the transaction layer packet. Upon receipt of the request transaction packet, the bridge (0,2,0) compares the destination bus number in the packet header to the range of buses that reside downstream of the bridge. If the bus destination number is downstream of the bridge (Bus 1 in this example), the packet will pass through. Devices coupled to Bus 1 compare the device number and the one that finds a match will accept the packet. Functions (a maximum of eight) on the destination device compare the function number in the header of the packet. The function addressed by the request packet will execute the requested task. Upon completion, the destination device will assemble a completion packet with its completer ID (1,0,0) and the requester ID address as the BDF (0,0,0) and sends the completion packet back to the RC through the bridge (0,2,0). The above described operation is based on the prior art BDF which is defined in FIG. 5a.

FIG. 5b shows the expansion of the BDF as a 16-bit universal routing ID (URID). The 16-bit URID expansion of the function space is meaningful as the conventional bus concept does not exist in the PCI-Express system. All PCIe links are point-to-point. Each link consumes a bus number. Each endpoint consists of a bus number, a device number which is always 0 on a bus (i.e., a link) and a function number (max. 8). The URID of the present invention enables 64K addressable functions in the PCI-Express fabric.

The present invention introduces a new URID capability configuration space. FIG. 6 shows an examplary set of configuration space registers for the URID capability. It consists of eight double-word (DW) registers. Only the first register (four bytes or double-word) is standardized in the PCI-Express configuration space. This register is read-only. Bits 0-15 (16 bits) are the Capability ID. Bits 16-19 (4 bits) are version number. Bits 20-31 (12 bits) are the Next Pointer referring to the list of capabilities. The second register is segregated into two 2-byte words. The lower word ("Functions Required") is read-only and stores the URID representing the 64K-function space. "Function Required" provides the number of functions contained in a device. The upper word (Base URID) is Read/Write and stores the Base URID, which is the assigned URID of the device. The third register is also divided into two words. The lower word ("Capabilities") is read-only and stores the device capabilities which are described in more detail in the following section. The upper word ("Control") is Read/Write and serves as on/off switches for the corresponding lower 16-bit capabilities. Each bit of the 16-bit Control word is paired with the corresponding bit in the 16-bit Capabilities word, i.e., the capabilities can be enabled or disabled depending on the corresponding bit status in the Control word. The fourth register currently defines only the lower word ("Limit URID"), which is stored in a port of a bridge or switch to indicate the highest URID range it supports downstream. The upper word is reserved for future use. The remaining four DW-registers are reserved for future use. Note with the exception of the first register which is standardized, the remaining registers used in this example are served as illustration only, and are not meant to be limitations. Various modifications or changes in light thereof will be suggested to persons skilled in the art.

Examples of the "Capabilities" (RO) are:

"URID Mode Enable" (this bit indicates whether or not the bridge/switch is capable of URID routing)

"ARI Compatibility Mode" (this bit indicates whether or not the bridge/switch supports the Alternative Routing Interpretation scheme)

"Support Tag Extension" (this bit indicates whether or not the device supports the use of unclaimed function numbers (called phantom functions) to extend the number of outstanding transactions allowed by logically combined phantom functions with the tag identifier)

"Freeze URID to configuration register" (when this bit is set, a device won't record the 16-bit URID when a Type 0 PCI configuration write request is addressed to the device)

"Backup Port Support" (this bit indicates whether or not the device or the switch has a failover mechanism as backup for the main port. The backup port may be a different physical port similar to a conventional failover port in a traditional network in order to minimize the impact of failure occurrence.)

"Acceptance Port Filtering" (this bit indicates whether or not the bridge/switch is capable of downstream packet filtering. When enabled, the bridge/switch will examine the source URID in an ingress transaction packet and determines whether the packet should be forwarded downstream or discarded)

Source URID Filtering (this bit indicates whether or not the bridge/switch is capable of upstream packet filtering. When enabled, the bridge/switch will examine the source URID in a transaction packet in consideration with the ingress port and determines whether the packet should be forwarded upstream or discarded)

Each of these capabilities can be turned on or off by the corresponding bit in the control portion of the same register.

The URID Capability Configuration Space Registers are shown as eight DW-registers located in the configuration space. Some examples of enhanced features are described using the eight DW-registers in the URID capability configuration space. FIG. 6 shows that the URID capability configuration space registers are immediately located after the standardized PCI register (Next pointer, Version, Capability ID). The examples shown use only three registers. It is understood that these URID registers can be located in other locations within the PCI-Express configuration space.

In operation, the RC may send a Type 0 configuration write request to address a URID device which records (latches) the entire 16-bit URID field in its configuration space. This configuration process is in line with how the bus number and device number are currently recorded in the standard PCI bus protocol. The difference is instead of recording the bus and device numbers, the device now records the 16-bit URID. Another configuration process can "freeze" the content of the Base URID register after sending a Type 0 configuration write request. For example, a URID capable device won't latch the 16-bit URID when addressed by a Type 0 PCI configuration write request if the "Freeze URID to configuration register" bit is set and enabled. The process of setting the "Freeze URID" bit can be achieved by writing a programming code which set the bit after sending a Type 0 configuration write request.

Upon power up, the enumeration software attempts to assign a Base URID to all devices present and a required number of URIDs equivalent to the number of functions available on each device. The required number of URIDs can be read from the "Functions Required" located in the device's URID Capability Configuration Space registers. The enumeration software does not assign URIDs for ports located on the downstream of a switch. In this case, the required number of URIDs may be implemented as read-only "0" bits from the primary, secondary and subordinate bus registers. This is similar to the mechanism allowing memory space address reservations to be expressed by base-address register setup.

Figure 7:
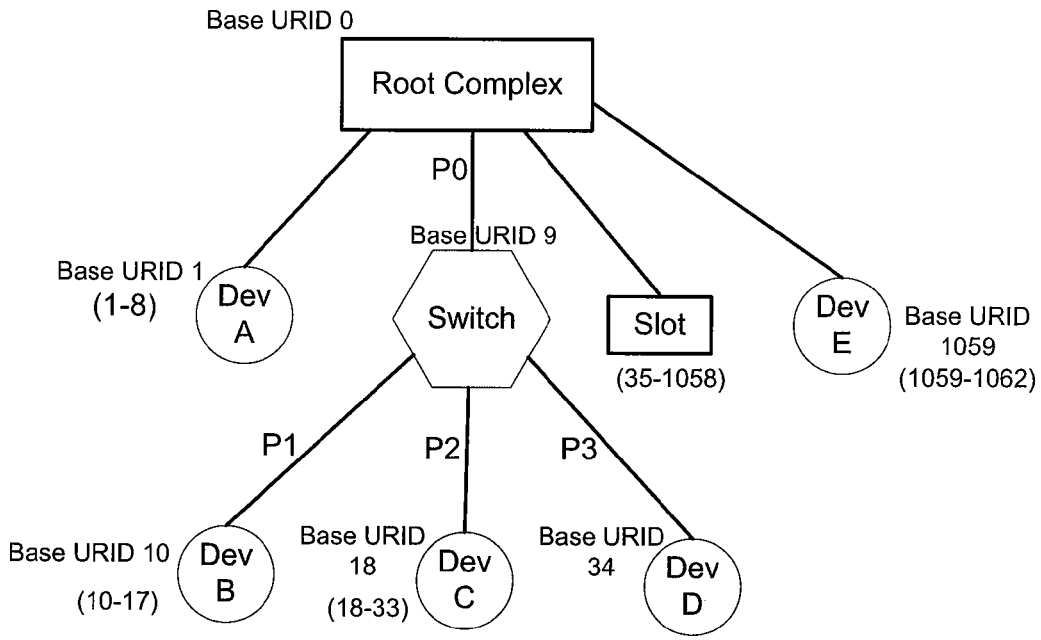
FIG. 7 shows an example PCI-Express URID system with the assigned Base URID and the number of required function IDs for each device in the system.

FIG. 7 shows an exemplary PCI-Express URID system with the number of required function IDs for each device of the system. The enumeration agent identifies the RC if a valid Vendor ID (i.e., not FFFFh) is returned. The RC is assigned the Base URID 0. This is similar to the standard PCI enumeration process. The enumeration process continues and discovers Device A, which requires 8 URIDs for its functions. Device A is assigned the Base URID 1, and its URIDs would be 1, 2, 3, 4, 5, 6, 7, and 8 for the eight functions. The enumeration process keeps track of all assigned URIDs, which are 8 in this case. Next, Switch Port P0 is discovered and assigned the Base URID 9, which is the next URID value available. Switch Port P0 requires only one URID. The enumeration process assigns the next available Base URID (which is now 10) to Device B on switch port P1. Device B has 8 functions with corresponding URIDs ranging from 10 to 17. Device C on switch port P2 is a multifunction device containing 16 functions, each of each requires its own URID. Device C is assigned the Base URID 18, and each of its 16 functions is assigned a URID ranging from 18 to 33. Device D is assigned the next available Base URID 34 (Device D has only one function). Next, Slot is enumerated with 1K (1024) URIDs. The example here illustrates that devices could be added (hot-plugged) while the system was in operation. One of the many advantages of the URID mechanism is the ease of reserving function space to dynamically support function additions without having to reconfigured the whole system.

The enumeration process continues the tracking of all assigned URIDs, which is now 1058 (Device D's URID 34 plus the Slot's reserved 1K URIDs ranging from 35 to 1058). Table 1 summarizes the result of the enumeration process.

TABLE 1

Example of the URID assignments according to FIG. 7.

| Component | Functions Required (2nd register in the URID Capability Configuration Space of FIG. 6) | Base URID | Limited-URID | Limit URID (Downstream) (4th register of FIG. 6) | Notes |
|---|---|---|---|---|---|
| Root Complex | 1 | 0 | 0 | 65535 | The Base URID starts with 0 |
| Device A | 8 | 1 | 8 | | |
| Switch Port 0 | 1 | 9 | 9 | | Upstream port |
| Switch Port 1 | 0 | | | 17 | Downstream port |
| Device B | 8 | 10 | 17 | | |
| Switch Port 2 | 0 | | | 27 | Downstream port |
| Device C | 16 | 18 | 33 | | |
| Switch Port 3 | 0 | | | 33 | Downstream port |
| Device D | 1 | 34 | 34 | | |
| Slot | 0 | | | | 1K URIDs reserved for the hot-plug slot |
| Device E | 4 | 1059 | 1062 | | |

The configuration example shown in FIG. 7 and the values in Table 1 above assume one of the many possible implementations that the configuration of the Switch is through the port P0. This is the reason that port P0 is assigned a URID, so that it can be addressed. The other ports are just ports in the PCIe fabric and don't have a URID assigned to them. In other implementations, there could be switches where each port would require a URID because they need to be addressed to provide additional configuration such as backup ports for fail-over protection.

Figure 8:
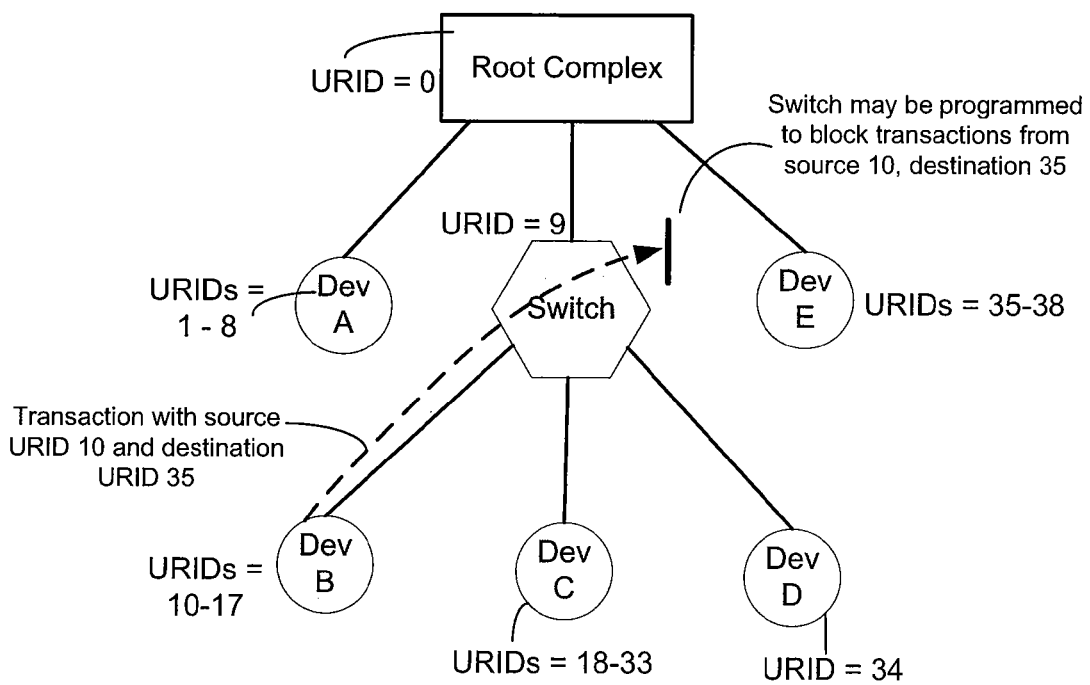
FIG. 8 shows a switch may be programmed to block a transaction from a specific source URID sent to a particular destination URID in accordance with the present invention.

FIG. 8 shows how a URID capable switch may be programmed to block a transaction packet sent from a device with specific source URID to a device with a particular destination URID. The filtering is enabled when the "Source URID filtering" bit and the corresponding control bit in the third register of the URID Capability Configuration Space Registers are set. The switch contains a data processing unit, e.g., a network processor with internal or external memory and a lookup table. The lookup table contains data entries such as the URIDs of the destination ports, the URIDs of the backup ports, the URIDs of the downstream accepted ports and the URIDs of the upstream permitted ports. The data processing unit parses (analyzes) the source URID and destination URID in the transaction packet's header and compares them against the data entries of the lookup table. Based on the result of the comparison, the switch will either direct the transaction packet to a port linked to the destination device or block it and return an unsupported request message to the source device. The example shown in FIG. 8 uses a similar configuration as FIG. 7 with the Slot removed. The devices are assigned a range of URIDs in accordance with the values of Table 1 with the exception of the Device E which has the URIDs ranging from 35 to 38 because the 1K URIDs reserved for the Slot are not required. The blocking of transaction packets in the switch or bridge can be understood as that the switch or bridge had a "dumping" port where all packets with invalid, not accepted (downstream), or not permitted (upstream) URIDs will be directed to. The dumping port may or may not exist physically.

FIG. 9 shows a possible data entry for the URID lookup table. "Dest" is the 16-bit URID of the destination device. "Dest" is compared with the destination URID of the transaction request. The comparison can be performed in software algorithms or with a binary or ternary CAM which delivers the address of the destination port when a match occurs.

"BkUpPort" is the 16-bit URID of the backup port of the device. When the "Backup Port Support" bit and the corresponding bit in the URID Capability Configuration Space Registers (CCSR) are set, and when there is a match between the "BkUpPort" and the URID of the request packet, the switch will forward the packet to the backup port of the destination device. As an example, the backup port is used when a failure occurs at the main port. "AcceptancePort" is the 16-bit acceptance port bitmap which provides filtering capability for a bridge or switch to block all downstream transaction packets having a destination URID that matches the "AcceptancePort". The downstream blocking function must be enabled by setting the "Acceptance Port Filtering" bit and the corresponding control bit. "PermittedPort" is the 16-bit permitted port bitmap which allows the switch to be configured to block all upstream transaction packets whose destination URID matches the "PermittedPort". In another embodiment of the present invention, the "AcceptancePort" and the "PermittedPort" are bitmaps that store the respective downstream and upstream valid URIDs, i.e., the switch or bridge only transmits transaction packets that have destination URIDs matched to the "AcceptancePort" and the "PermittedPort" and blocks all other packets.

The implementation of a lookup table with the above mentioned URID features allows a switch to filter, arbitrate and redirect transaction packets. The introduction of URID eliminates the notion of bus hierarchy and bus arbitration and enables the PCIe fabric to address 64K function devices. In order to exploit the features of the present invention, transaction packets must have the URID capability segment (FIG. 6). When it receives a transaction packet, a URID capable switch will verify whether or not the packet contains the URID capability segment and whether or not the "URID Mode Enable" bit is enabled. Based on information obtained from the URID capability segment, the bridge or switch will handle the packet accordingly, i.e., as a normal packet in accordance with the PCIe specification (including ARI), or a URID routed packet contained the enhanced capabilities.

The URID capability segment starts in a specified location of the PCIe configuration space. Any URID capable device must implement this capability segment (i.e., the URID Capability Configuration Space Registers of FIG. 6).

The foregoing description has been presented for purposes of illustration. It is not intended to be exhaustive or to limit the disclosure. Obvious modifications or variations are possible in light of the above teachings.

What is claimed is:

1. A method for routing a plurality of transaction packets in a data processing system having a plurality of devices coupled to a switched fabric, the method comprising:

assigning a routing identifier that is unique to each device;

inserting a first routing identifier in a first transaction packet that is sent from a first device, wherein the first transaction packet has a modified PCI-Express format that replaces the bus-device-function (BDF) number field in a standard PCI-Express format with a 16-bit universal routing identifier (URID) field, wherein the first routing identifier is inserted in the URID field as the 16-bit URID;

receiving the first transaction packet containing the first routing identifier by a second device;

comparing the first routing identifier against a routing database having a plurality of data entries stored in the second device; and routing the first transaction packet through a predetermined port in the second device based on the result of the comparing.

2. The method of claim 1 wherein the standard PCI-Express format is a bus-device-function (BDF) format that includes a plurality of number fields comprising an 8-bit bus number, a 5-bit device number, and a 3-bit function number.

3. The method of claim 1 wherein the 16-bit universal routing identifier (URID) enables routing of the plurality of transaction packets to a plurality of device functions independent of distribution of the device functions to devices and buses of the data processing system.

4. The method of claim 1 wherein the data entries of the routing database comprise a plurality of URIDs for destination ports, backup ports, acceptance ports and permitted ports.

5. The method of claim 1 wherein the comparing further identifies whether the first routing identifier is the standard BDF format or the URID format.

6. The method of claim 1 wherein the assigning of the first routing identifier is performed with a Type 0 PCI configuration write in accordance with a PCI standard protocol.

7. A method for assigning a plurality of routing identifiers to a plurality of devices in a PCIe fabric, the method comprising:

a first configuring mechanism which enumerates the plurality of devices according to their order of discovery; and a second configuring mechanism which assigns the plurality of routing identifiers to the plurality of devices using a specific programming code, each routing identifier of the plurality of routing identifiers comprising a 16-bit universal routing identifier (URID) that replaces the bus-device-function (BDF) number in a PCI-Express transaction packet, the URID enabling routing of the PCI-Express transaction packets to a plurality of device functions independent of distribution of the device functions to devices and buses of a host data processing system.

8. The method of claim 7 wherein each of the routing identifiers comprises an extended field that replaces the bus-device-function (BDF) number field in a standard PCIe format with a 16-bit universal routing identifier (URID) field.

9. The method of claim 7 wherein each of the devices comprises a PCI-Express configuration space having a plurality of configuration registers.

10. The method of claim 7 wherein the first configuring mechanism assigns the plurality of routing identifiers to the plurality of devices by sending Type 0 PCI configuration write requests in accordance with a PCI Bus-based enumeration process.

11. The method of claim 7 wherein the second configuring mechanism writes a base routing identifier to a first base configuration register of a first device, and wherein the specific programming code freezes the first base configuration register of the first device by setting a plurality of bits in a second capabilities register containing in the first device.

12. A system for routing a plurality of modified PCI-Express transaction packets to a destination device in a data processing system having a plurality of devices coupled to a switch fabric, the system comprising:

at least one processor an agent coupled to the processor and assigning a unique routing identifier to each device;

a comparing mechanism coupled to the processor and determining if the routing identifier is contained within a routing database;

a routing mechanism coupled to the processor and forwarding the transaction packet to the destination device;

wherein the destination identifier is the unique routing identifier assigned by the agent; and wherein the unique routing identifier conforms to a modified PCI-Express format that replaces the bus-device-function (BDF) number field in a standard PCI-Express format with a 16-bit universal routing identifier (URID) field, wherein the unique routing identifier is inserted in the URID field as the 16-bit URID enabling routing of the transaction packets to the plurality of devices independent of distribution of the plurality of devices and buses of the data processing system.

13. The system of claim 12 wherein the standard PCI-Express format is a bus-device-function (BDF) format that includes a plurality of number fields comprising an 8-bit bus number, a 5-bit device number, and a 3-bit function number.

14. The system of claim 12 wherein the comparing mechanism is based on a lookup table having a plurality of entries for destination ports, backup ports, downstream accepted ports and upstream permitted ports.

15. The system of claim 14 wherein the comparing mechanism verifies the validity of the source identifier associated with a source port.

16. The system of claim 14 wherein the comparing mechanism verifies whether the source identifier has the permission to route the transaction packet to a destination port.

17. The system of claim 14 wherein the comparing mechanism verifies the validity of the routing identifier associated with a destination port.

18. A routing apparatus for routing modified PCI-Express transaction packets among a plurality of devices in a data processing system, the routing apparatus comprising:

a plurality of ports, each port conforming to a PCI-Express physical format which is standardized by PCI-SIG;

a lookup table with a plurality of data entries;

a data processing unit coupled to the lookup table; and wherein the modified PCI-Express transaction packets conform to a modified PCI-Express format that replaces the bus-device-function (BDF) number field in a standard PCI-Express format with a 16-bit universal routing identifier (URID) field, wherein a 16-bit routing identifier is inserted in the URID field to enable routing of the transaction packets to device functions of the plurality of devices independent of distribution of the device functions to devices and buses of the data processing system.

19. The routing apparatus of claim 18 wherein each device can transmit and receive the modified PCI-Express transaction packets.

20. The routing apparatus of claim 18 wherein each of the modified transaction packets comprises a source identifier and a destination identifier.

21. The routing apparatus of claim 20 wherein the each of the source identifier and the destination identifier is inserted in an extended identifier field.

22. The routing apparatus of claim 21 wherein the standard PCI-Express format is a bus-device-function (BDF) format that includes a plurality of number fields comprising an 8-bit bus number, a 5-bit device number, and a 3-bit function number.

23. The routing apparatus of claim 18 wherein the data processing unit processes the source identifier and the destination identifier of each transaction packet, verifies the validity of the source identifier, determines a destination port associated with the destination identifier and routes each transaction packet having the destination identifier to the destination port which is coupled to a destination device.

24. The routing apparatus of claim 23 wherein the verification of the source identifier and the determination of the destination identifier are performed using the lookup table.

* * * * *